July 27, 1943.  W. G. BURNS  2,325,107
FISH LURE
Filed Nov. 4, 1940
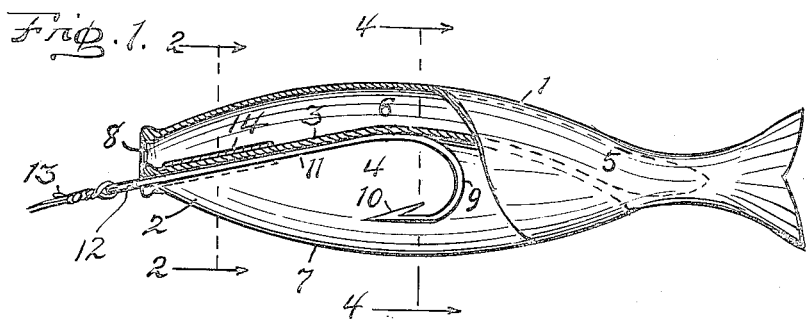
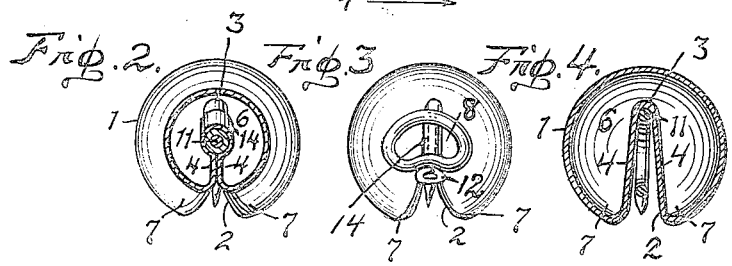
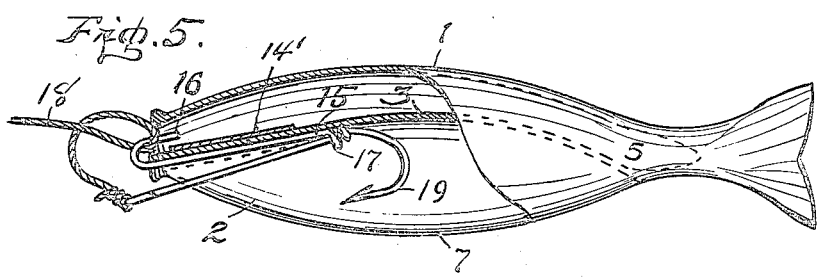
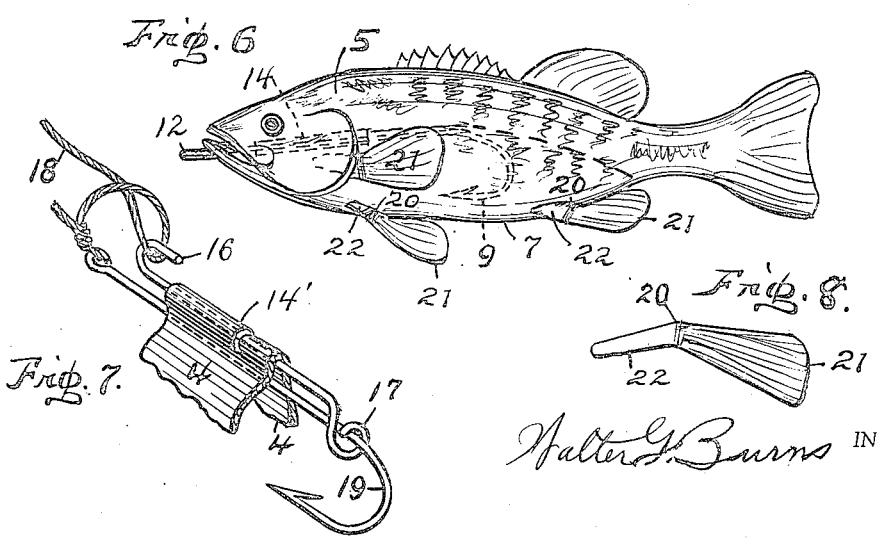
Walter G. Burns INVENTOR.

Patented July 27, 1943

2,325,107

UNITED STATES PATENT OFFICE 2,325,107

FISH LURE

Walter G. Burns, Fort Wayne, Ind.

Application November 4, 1940, Serial No. 364,166

17 Claims. (Cl. 43—39)

This invention relates to improvements in fish lures, and an object thereof is to afford a bait having a body in the form of a flexible water-containing pouch in conjunction with a fish-hook, the barb of which is normally concealed by the pouch and which becomes fully exposed when the body is crushed wherefore to more readily ensnare an attacking quarry.

Another object of the invention is to afford in a bait an open-mouthed flexible pouch adapted to become filled with water when immersed and from which its contained water is freely expelled when the pouch is crushed by the quarry, and a hook arranged in connection with the pouch in such manner as to be normally concealed by the pouch until the pouch becomes collapsed when the bait is attacked.

Another object of the invention is to afford in a bait a water-containing pouch in conjunction with a hook, whereby the water content of the body functions as a ballast, thus to facilitate flight of the bait through the air when cast with the use of a rod and line.

Another object of the invention is to afford in conjunction with a fish hook a flexible open-mouthed water-containing pouch having a general configuration simulating a living creature such as a fish, frog, crawfish or other object usually sought as food by the quarry, the hook being normally concealed by the pouch structure and its barb exposed when the bait is attacked.

A further object of the invention is to provide in connection with a fish hook an open-mouthed flexible pouch that becomes filled with water when immersed and in which the water is retained while the bait is trolled, thus to sustain in full expansion the general form of the bait body and to permit free expulsion of its water content and collapse of the pouch when the bait is attacked, whereby to facilitate engagement of the hook with the quarry.

A still further object of the invention is to afford a fish bait having a flexible body, a hook, and a securing member so constituted as to attach the body and hook together in such manner that relative axial and angular movements of the body and hook at the point of attachment are forestalled and thus sustain the parts in a desired position.

Also, an object of the invention is to construct a bait body having flexible walls and attached fin members extending angularly therefrom in such manner that flexure of the walls of the body occur to simulate likelike action when drawn by an attached line intermittently through the water.

Other objects and advantages of the invention appear in the following description.

Illustrative embodiments of the invention are shown in the accompanying drawing, in which—

Fig. 1 is a side elevational view of a structure in which the invention is embodied, a portion thereof being cut away;

Fig. 2 is a transverse sectional view of Fig. 1 on the line 2—2 thereof;

Fig. 3 is a front end view of the structure illustrated in Fig. 1;

Fig. 4 is another transverse sectional view of Fig. 1 on the line 4—4 thereof;

Fig. 5 is a side elevational view in which is illustrated a fixture by which is detachably secured a hook and line in connection with the bait body, a portion thereof being broken away;

Fig. 6 is a side elevational view of a bait illustrating a form of body provided with flexors therefor;

Fig. 7 is a fragmentary perspective view showing the fixture and associated parts; and Fig. 8 is a detail perspective view of a flexing fin that is attached to the body of the bait illustrated in Fig. 6.

The illustrative embodiment of the invention consists of a bait body, a fish hook and a fastener by which the body and hook are permanently and fixedly secured together.

The bait body

A preferable form of the body consists of a lobated pouch 1 made of thin elastic material, such as rubber, shaped to characterize the form of a fish or other creature, and has further the formation of a crevice or open pocket 2 that extends centrally lengthwise from the front end of the body, in the belly portion thereof, and terminates at any suitable point adjacent its tail end. Thus, there is within the hollow body a crest or ridge 3 that conforms with the apex of the crevice. The side walls 4 of the pocket are divergently disposed from the apex thereof outwardly to a suitable extent, the bottom of the pocket being open with respect to the exterior of the body.

The wall 5 of the pouch is formed initially so the body is normally lobular and affords a chamber 6 that extends astride the pocket 2 and into the lobes 7. The front end of the body has a mouth 8 that permits free ingress and egress of water into and from the body when submerged. The pouch thus formed is capable of receiving and holding a quantity of water that serves as ballast to facilitate flight of the bait through the air when cast, and also to sustain the rotundity of the body while the bait is trolled. The mouth, being open, permits expulsion of the water from the chamber and collapse of the walls of the body when external pressure is applied to the pouch, as when the bait is attacked.

The hook

The fishhook 9, preferably is of the ordinary type, and is disposed within the pocket 2 with its barb 10 located in the pocket substantially midway between the walls 4 thereof. The shank 11 of the hook closely underlies the ridge 3 and the eye 12 of the hook extends forwardly beyond the mouth 8 suitably to permit convenient attachment thereto of a fish line 13.

The fastener

The hook is secured to the pouch by means of a fastener preferably consisting of a longitudinally split tube 14 that is placed astride over the ridge and the underlying shank of the hook, and then clinched firmly in place so as to compress the ridge and adjacent portions of the side walls 4 firmly about the shank. In this manner the hook is secured permanently to the pouch and axial as well as rotary movement of the shank relative to the pouch at the point where attached is prevented.

The fixture

In Figs. 5 and 7 is shown a modified form of the invention in which is detachably secured an ordinary hook and line to the bait body. In this form a fixture 15 is secured in the pocket underlying the ridge 3 in the forward portion thereof. The fixture preferably is formed of wire shaped with a straight middle portion terminating at one end with a backturned crook 16, and at its opposite end with a loop or open coil 17. The fixture is secured in place by means of a fastener 14' similar to and applied in like manner to that shown in the form illustrated in Figs. 1, 2, 3 and 6. When the fastener is clinched, the fixture is held permanently in place in connection with the pouch. The terminus of the open crook 16 preferably protrudes through the open mouth of the pouch and is free to receive a bight formed in the line 18, and the open coil 17 extends into the pocket at a point beyond the inner end of the fastener 14' and is adapted to readily receive and detachably support the fishhook 19 that is attached to the line 18. As the pouch is flexible, manipulation thereof permits exposure of the open coil and ready application of the hook thereinto. In this form of the invention the bait is easily attachable to and detachable from an ordinary hook and line, simply by engaging the hook in the open coil and looping the line around the inturned forward end of the fixture. Thus, in the event of destruction of the bait it may be readily detached and discarded and replaced by a new bait without loss of the hook with which it is used.

The flexors

The exterior walls of the pouch being thin and pliant are subject to flexure which is desirable in effecting appearance of animation when intermittently induced. For this purpose there is attached exteriorly to the wall of the pouch at appropriate points thereon flexors 20 (Figs. 6 and 8) formed of any suitable stiff thin sheet material shaped to simulate fins 21. The flexors are formed to have a base portion 22 that is attached in any suitable manner to the wall of the pouch, and have wide flaring portions to simulate fins that extend laterally outward at an angle from the wall of the pouch so as to be resisted by the surrounding water when the bait is trolled and thus cause angular movement of the fins relative to the wall with resultant flexure thereof. Thus, when the bait is trolled, especially when the pull on the fish line is caused to be irregular or intermittent, the movement of the fins and consequent flexure of the wall of the pouch creates apparent lifelike action of the bait.

Operation

In using the bait, in the form shown in Fig. 1, a line is connected to the eye 12 of the hook and the bait is then bodily submerged, whereupon the pouch becomes filled with water which affords weight that is advantageous because of the impetus developed by casting the bait through the air and thus enabling the fisherman to throw the bait, which otherwise is light in weight, a great distance. As the hook is normally disposed within the pocket, its barb is fended by the lobes so that the bait may be drawn deliberately past reeds and the like without likelihood of its becoming fouled or lost because of entanglement therewith. When the bait is attacked by the quarry, the pouch becomes collapsed more or less, which is unresisted because of the consequent escape of water from the pouch, and incidentally the hook protrudes from the pocket and ensnares the quarry. When caught on the hook the quarry is easily removed from the hook upon flexing the pouch.

When the bait in the form illustrated in Figs. 5 and 7 is used, an ordinary hook and line is attached to the bait by flexing the pouch to expose the open coil, inserting the hook therein and then looping the line over the backturned end of the fixture. Upon subsequently drawing the line forwardly, thus tightening the bight around the front end of the fixture, the fish hook thereupon is drawn back into the pocket to its proper operating position where it is held during manipulation of the bait. In both instances, the water contained in the pouch serves as ballast while casting the bait, and also because of the elasticity of the pouch and its open mouth, while trolling, more or less alternate expansion and contraction of the pouch and relative movement of the flexors occur especially when the pull of the line is intermittent or of irregular force, thus creating a semblance of life.

An outstanding feature of the invention is that the pouch, weighted with water, during its flight through the air when cast, affords the essential weight for the bait which is of value especially when the bait is thrown into a strong head-wind, during which time the weight is potent, and upon alighting in the water becomes impotent. Therefore, the ballast in this invention is distinguishable from ordinary lead sinkers.

Variations from the particular construction above disclosed may be resorted to by the exercise of skill in the art, without departure from the spirit or scope of the invention, and the following claims are intended to be inclusive of such variations.

What I claim is:

1. A fish bait consisting of a hollow chambered body formed of thin flexible material, provided with a water-containing chamber therein and an opening in its forward end for ingress and egress of water to and from said chamber and having formed in its belly portion a longitudinal crevice to provide a pocket open to the exterior of the body and closed to said chamber, a fish hook located in said pocket with its shank closely underlying the crest thereof, the eye of said hook extending forwardly for convenient attachment thereto of a line, a fastener disposed astride the crest of the pocket and shank having clinched relation therewith to permanently secure the hook and pocket together against relative axial and angular movement of the parts where thus secured, and flexors secured exteriorly to the wall of the body having flaring portions that extend outwardly from the wall wherefore to cause buckling of adjacent regions of the wall when the bait is trolled, thus to simulate animation.

2. A fish bait having a body, a fish hook and a fastener for securing the body and hook together, said body consisting of a flexible water-containing pouch having an open mouth and a crevice formed in its belly portion that is open to the exterior of the pouch and closed to the interior thereof, said hook having a shank positioned in said pocket closely underlying the crest of the pocket, and said fastener being disposed astride the crest and said shank in clinched relation therewith wherefore to prevent relative movement of the parts thus secured together.

3. A fish bait having a flexible lobated hollow pouch provided with an open mouth and a crevice in its belly portion open to the exterior of the pouch and closed to the interior thereof, a fish hook disposed in said crevice having a forwardly extending eye for the attachment of a line and a barb disposed within the crevice between said lobes and normally fended thereby, and a fastener for securing said pouch and hook together at a point in the pouch spaced back from the eye of the hook.

4. A fish bait having a body constituted of a flexible lobated pouch, closed at its rear end and provided with an open mouth and having an open pocket extending within the pouch closed to the interior thereof, a fish hook positioned in said pocket with a part thereof secured to the pouch at a point adjacent said mouth, and flexors secured exteriorly to the pouch extending angularly therefrom when the bait is trolled to cause buckling of adjacent portions of the pouch wherefore to simulate animation.

5. A fish bait having a body constituted of a flexible lobated pouch, closed at its rear end and provided with an open mouth and having an open pocket extending within the pouch and closed to the interior thereof, and a fish hook positioned in said pocket with a part thereof secured to the pouch at a point adjacent said mouth.

6. A fish bait including a body that consists of a flexible pouch having an open mouth and which is adapted to become filled with water when submerged and to retain its content of water upon emergence and suspension thereof mouth upward, and a fish hook secured exteriorly to and normally concealed by said pouch, the water content of said pouch, when the bait is cast through the air, constituting ballast wherefore to maintain impetus during flight thereof.

7. A fish bait including a body consisting of a flexible pouch having an open mouth and adapted to become filled with water when trolled mouth forward, and a fish hook secured exteriorly to and normally concealed by said pouch, the mouth of said pouch affording free ingress and egress of water into and from said pouch wherefore the wall of said pouch is fully extended by its content of water while the bait is trolled, and collapses upon attack, thus to facilitate ensnarement of a quarry by the hook.

8. A fish bait consisting of a flexible pouch having a mouth permitting free ingress and egress of water into and from said pouch, said pouch having longitudinal lobes and a crevice therebetween the crest of which extends interiorly with respect to said pouch, a fish hook having a shank positioned in said crevice closely underlying said crest, and a fastener disposed astride said crest and underlying shank and clinched thereon wherefore to permanently secure said hook normally within the crevice to the pouch.

9. A fish bait consisting of a flexible pouch having an open mouth and an exteriorly open pocket extending lengthwise of the pouch rearwardly from the mouth, said pocket being closed to the interior of said pouch, and a hook having a shank the forward portion of which is secured to the pouch so that the barb end of said hook is normally held within the pocket and exposed upon collapse of said pouch.

10. A fish bait consisting of a flexible pouch having an open mouth and longitudinal lobes, there being a crevice therebetween extending interiorly and open exteriorly with respect to the pouch, and a fish hook secured to the body at a point adjacent the mouth thereof with its barbed end normally concealed in the crevice and fended by said lobes while the bait is trolled.

11. In a fish bait, a flexible pouch having an open mouth and a longitudinal crevice extending interiorly and open exteriorly with respect to said pouch, a fixture secured to said pouch in the forward end of said crevice, the forward end of said fixture being shaped for attachment to a fish line and the rear end of said fixture having an open coil adapted for removably attaching a fish hook while connected with said line, wherefore the barb end of said hook is normally concealed in the crevice.

12. A fish lure attachable to and detachable from an ordinary fish hook and line, said lure consisting of a flexible pouch having an open mouth and a longitudinally elongated pocket extending interiorly and open exteriorly with respect to the pouch, a fixture disposed in said pocket shaped at its forward end for detachable connection with a fish line and at its opposite end for detachable connection with and support for a fish hook attached to said line, and a fastener clamped in connection with the pocket and said fixture permanently securing the pouch and fixture together.

13. In a fish bait, a flexible open-mouthed pouch capable of holding water when suspended mouth upward in the air, wherefore to afford ballast, said pouch having an exteriorly open pocket, a fish hook disposed in the pouch with its barbed end normally concealed in said pocket, and a fastener securing said hook permanently in connection with the pouch.

14. In a fish bait, a hook and line attached together, a flexible water-holding open-mouthed pouch constituting a lure and ballast when the pouch is filled with water, and a fixture permanently attached exteriorly to said pouch and detachably connectable with said hook in such manner that said hook is normally concealed by said pouch.

15. In a fish bait, a flexible water-holding open-mouthed pouch constituting a lure and ballast for the bait when the pouch is filled with water, and a fish hook secured exteriorly to and normally concealed by the pouch.

16. A fish lure consisting of an open-mouthed pouch, a fish hook exteriorly disposed respecting the pouch, and a fastener within the pouch clinching part of the wall of the pouch onto an adjacent part of said hook to secure the pouch and hook permanently together.

17. In a fish lure where there is used an element consisting of a fish line and fish hook connected together, a pouch having an open mouth, the body of the pouch being closed to the exterior thereof throughout its length and at its tail end, and the pouch being provided with means by which to detachably secure said line and hook individually to the pouch externally with respect thereto while the line and hook are connected together.

WALTER G. BURNS.